US011210279B2

United States Patent
Kachemir et al.

(10) Patent No.: US 11,210,279 B2
(45) Date of Patent: Dec. 28, 2021

(54) DISTRIBUTED OFFLINE INDEXING

(71) Applicant: Apple Inc., Cupertino, CA (US)

(72) Inventors: Rachid Kachemir, Mountain View, CA (US); Krishna M. Behara, Santa Clara, CA (US); Bradley C. Kellett, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 15/487,391

(22) Filed: Apr. 13, 2017

(65) Prior Publication Data

US 2017/0300490 A1    Oct. 19, 2017

Related U.S. Application Data

(60) Provisional application No. 62/323,507, filed on Apr. 15, 2016.

(51) Int. Cl.
*G06F 16/22* (2019.01)
*G06F 16/27* (2019.01)
*G06F 7/24* (2006.01)

(52) U.S. Cl.
CPC ............ *G06F 16/2255* (2019.01); *G06F 7/24* (2013.01); *G06F 16/278* (2019.01)

(58) Field of Classification Search
CPC ....... G06F 16/2255; G06F 16/278; G06F 7/24
See application file for complete search history.

(56) References Cited

U.S. PATENT DOCUMENTS

| 5,551,027 | A | * | 8/1996 | Choy | ...................... G06F 9/355 |
| 8,447,120 | B2 | | 5/2013 | Ji et al. | |
| 8,583,657 | B2 | * | 11/2013 | Shukla | .............. G06F 16/24554 |
| | | | | | 707/747 |
| 9,158,835 | B2 | | 10/2015 | Prahlad et al. | |
| 2008/0228802 | A1 | * | 9/2008 | Marshall | ............ G06F 16/2282 |
| 2010/0235606 | A1 | * | 9/2010 | Oreland | .............. G06F 16/2255 |
| | | | | | 711/173 |
| 2012/0323931 | A1 | * | 12/2012 | Buchmueller | ...... G06F 16/9537 |
| | | | | | 707/749 |
| 2013/0060815 | A1 | * | 3/2013 | Saeki | ...................... G06F 16/27 |
| | | | | | 707/802 |
| 2013/0073374 | A1 | | 3/2013 | Heath | |
| 2013/0073581 | A1 | * | 3/2013 | Sandholm | ........... G06F 16/2471 |
| | | | | | 707/769 |
| 2013/0311426 | A1 | * | 11/2013 | Erdogan | ................. G06F 16/27 |
| | | | | | 707/610 |
| 2013/0325903 | A1 | * | 12/2013 | Rohlf | .................. G06F 16/2246 |
| | | | | | 707/797 |

(Continued)

*Primary Examiner* — Hosain T Alam
*Assistant Examiner* — Anthony G Gemignani
(74) *Attorney, Agent, or Firm* — Womble Bond Dickinson (US) LLP (57) ABSTRACT

A distributed offline indexing system uses a set of data processing systems in a distributed computing environment to create an index database that can store, for example, data about geographical or geospatial areas. The index database can be distributed across a plurality of database shards such that each shard includes an index file and a DB file. The index files include keys that refer to values in their corresponding DB files. The keys are used to look-up their corresponding values at search time. At indexing time, the keys are hashed, with an entropy creating hash, to distribute the keys across the shards.

20 Claims, 6 Drawing Sheets

(56) References Cited

U.S. PATENT DOCUMENTS

| | | | |
|---|---|---|---|
| 2014/0164389 A1 | 6/2014 | Hampapur et al. | |
| 2015/0156123 A1* | 6/2015 | Xiao | H04L 47/12 370/230 |
| 2015/0186793 A1* | 7/2015 | Ioffe | G06N 20/00 706/12 |
| 2015/0242413 A1* | 8/2015 | Goo | G06F 16/2272 707/613 |
| 2015/0261840 A1* | 9/2015 | Clifford | G06F 16/24537 707/807 |
| 2015/0281081 A1* | 10/2015 | Rajahalme | H04L 45/7453 370/392 |
| 2015/0356088 A1* | 12/2015 | Berkhin | G06F 16/24578 707/748 |
| 2015/0358322 A1* | 12/2015 | Krieger | H04W 12/06 713/181 |
| 2016/0055248 A1* | 2/2016 | Goel | G06F 16/93 707/770 |
| 2016/0070608 A1* | 3/2016 | Caufield | G06F 16/25 719/312 |
| 2016/0324237 A1* | 11/2016 | Cassell | A43C 19/00 |

* cited by examiner

DISTRIBUTED OFFLINE INDEXING

This application claims priority to and the benefit of U.S. Provisional Patent Application No. 62/323,507, filed Apr. 15, 2016, which application is hereby incorporated herein by reference.

BACKGROUND

The embodiments described herein relate to distributed computing environments and to processes in those environments that create databases.

The creation of large databases can require enormous computing resources. For example, a database that provides information about businesses (e.g. coffee shops, grocery stores, restaurants, etc.) in a specific geographic or geospatial region (such as a zip code or area defined by one or more pairs of a latitude and a longitude) can require many hours to create even if the creation process uses a distributed computing environment (e.g. online distributed indexing) in which parallel processing is performed concurrently with multiple data processing systems. As the geographical data in a region can change frequently over time, it is often necessary to create a new database frequently. Moreover, a geographic or geospatial database can often be defined by "keys" that subdivide the "map" into very small regions, and thus the number of keys can become very large. For example, databases can use a design based on key, value pairs, where the key defines the region and the value is the information returned as a result of a search using the key as the search query. In the case of Bluedot®, which is a service (from Bluedot® Innovation) that provides contextual information to devices without resorting to GPS to provide position (e.g. latitude/longitude), the number of keys is over a billion. Even with many data processing systems in a distributed computing environment, it can take many hours to create a database that contains over a billion keys. The present description provides embodiments that can improve these creation times.

SUMMARY OF THE DESCRIPTION

The embodiments described herein can operate in a distributed computing environment that creates a partitioned database having a plurality of shards, each shard being one of the partitions, and each shard can be a dense index that includes both a key file (that includes a set of keys) and a database file (that includes the corresponding set of values) that can be implemented as an append only file in one embodiment. The distributed computing environment can hash the keys with a hash function in order to generate a partition number or identifier to allocate the indexing of the key, value pairs to the various partitions on a somewhat even basis to distribute the indexing workload evenly. In one embodiment, the hash function is configured to provide entropy across the created hash values for the different keys to spread the keys among the different shards such that keys for a dense geospatial area (e.g. New York City) will be spread across most if not all shards/partitions.

In one embodiment, a distributed computing environment can perform a method comprising the following operations: receiving a plurality of inputs, each input comprising a key and a value pair; computing, for each key, a hash value using a hash function configured to provide entropy across hash values for different keys to distribute the keys across a plurality of partitions; determining, based on each hash value, a partition identifier and mapping the corresponding key (that was hashed to create the hash value) to the determined partition identifier; sorting, separately within each partition on a data processing system dedicated to processing the partition, keys mapped to the partition to provide a sorted set of keys mapped to the partition; storing, within each partition, the keys and their paired values, the keys being stored in an index file and their paired values being stored in a database file, wherein each key refers to its paired value in the database file within the partition. In one embodiment, each partition, in the plurality of partitions, is a database shard, and the keys represent different geographic or geospatial areas (e.g. zip code or region defined by latitude/longitude, etc.) and one city or geographic region can be dispersed across all shards due to the entropy. In one embodiment, the entropy tends to balance the indexing workload (e.g. the sorting and the writing/storing of the keys and the values/database files) and the storage usage across all of the data processing systems that create and store all of the shards, and the entropy disperses the keys for one geographic region (e.g. New York City) across a plurality (e.g., all) shards. In one embodiment, the keys are used to search for and retrieve values by hashing each of the keys (e.g., a search query or request specifies directly or indirectly a key which is then hashed with the same hash function used in the process of creating the hash value that was used to identify a partition for the key); the hashing of the key (specified by the search query) identifies the partition/shard containing the key, and then the key is used to find the corresponding value within the identified partition/shard.

In one embodiment, each partition or shard has a set of one or more data processing systems dedicated to sorting and storing the keys and their values within the identified partition; for example, a partitioner system can define the partitions by computing hash values for all input keys and then can dispatch for dedicated processing all key, value pairs, for a particular partition/shard to a particular set of systems that are dedicated to sorting and storing the keys (and their values) in that particular partition/shard.

In one embodiment, each partition or shard includes a Bloom filter that stores values representing geospatial tiles in a two-dimensional map. The values stored in the Bloom filter can be quadtree keys representing tiles in a quadtree layout that represents a geospatial area. In one embodiment, the quadtree keys are represented in base 10 values with a shift offset to provide unicity across all nodes in a quadtree layout, wherein each node in the quadtree contains one of the quadtree keys.

The methods described herein can be implemented by a variety of different data processing systems with different architectures. The methods described herein can also be implemented by one or more data processing systems which execute executable instructions, stored on one or more non-transitory machine readable media, that cause the one or more data processing systems to perform the one or more methods described herein. Thus the embodiments described herein include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
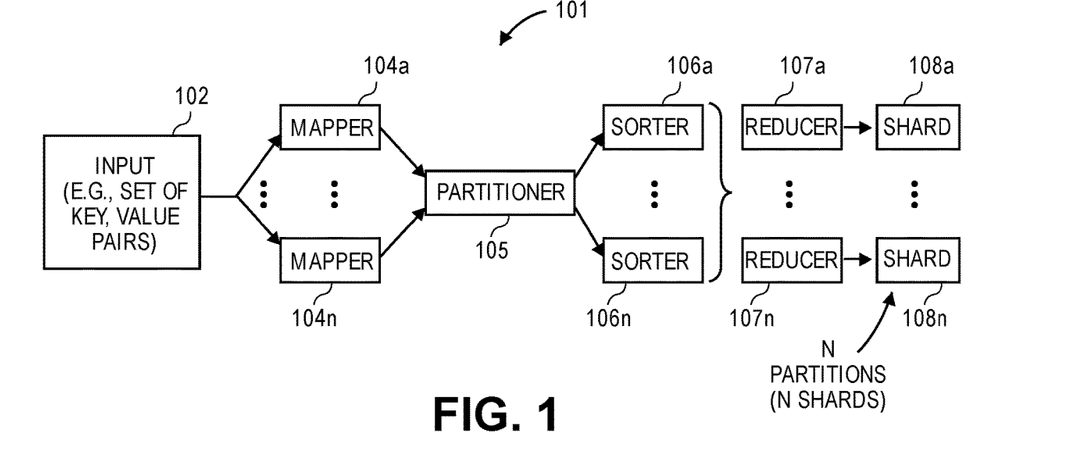
FIG. 1 shows an example of a distributed computing environment according to one embodiment.

FIG. 1 shows an example of a distributed computing environment which can contain a plurality of data processing systems, such as desktop computer systems or server systems each of which is controlled, in one embodiment, by software that enables a distributed computing environment such that the different computers in the environment are coordinated to work together and perform specific tasks as specified by one or more systems which manage the environment to ensure that the data processing tasks are distributed among the various data processing systems to allow for concurrent and parallel data processing as is known in the art. In the environment 101 shown in FIG. 1, a plurality of mapper systems, such as mapper systems 104A through 104N receive an input 102 and process that input by determining or parsing the various portions of the input into different categories. For example in one embodiment, the input may be formatted in a conventional key, value pair, and each input can be in this key, value pair format.

Figure 2:
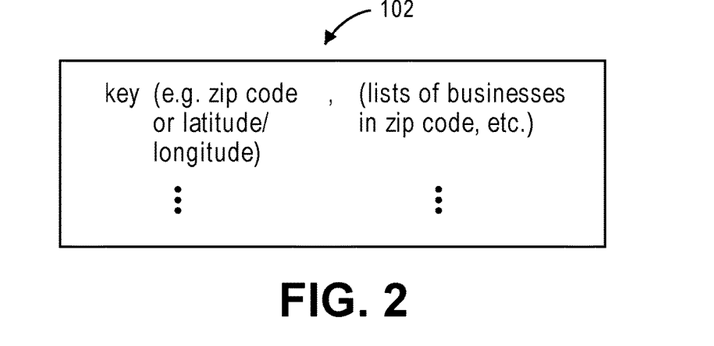
FIG. 2 shows an example of an input or set of inputs which can be provided to a distributed computing environment.

FIG. 2 shows an example of a set of key, value pairs in one embodiment. For example, the input 102 shown in FIG. 2 shows that each key can specify a zip code or other geographic region (by for example, specifying a latitude and a longitude or a set of latitude and longitudes), and for each key, there is a corresponding set of information or values, such as a list of businesses within the particular zip code, etc. In one embodiment, a geographic region, such as a city or a state or a nation can be sub-divided into regions, each region being specified by a key, and then corresponding values are assigned to that key. Each of the mapper systems 104A through 104N processes the inputs to transform or parse the inputs so that the keys can be recognized and processed by the partitioner system 105.

In the embodiment shown in FIG. 1, the partitioner system 105 can be a single data processing system or a set of data processing systems in an alternative embodiment. The partitioner system 105 receives the plurality of keys from the mapper systems 104A through 104N and processes these keys in a manner described below in conjunction with FIG. 4 to derive a partition identifier or number for each key based on a computation performed by the one or more partitioner systems 105.

The result of the operations of the partitioner system 105 provides a set of keys for each partition, where each key has now been assigned (by the partitioner system 105) to a particular partition based upon the number of partitions in the computing environment 101. In the example shown in FIG. 1, there are N partitions or N shards 108A through 108N. In one embodiment, there may be 10 or 15 shards which disperse the keys across the shards as will be described further below.

The partitioner system or set of partitioner systems 105 provide the keys and their corresponding values along with the identified partition for each key to a set of sorter systems 106A through 106N. Each of these sorter systems can be dedicated to processing only those keys assigned to a particular shard in one embodiment. Thus, each sorter system in this embodiment can be dedicated to processing keys and their corresponding values within only a particular partition. This has the advantage that it distributes the sorting work essentially or substantially evenly across the sorter systems if the partitioner can allocate the keys substantially evenly across the N shards. The sorter systems each sort the keys in an order (e.g., sorting lexicographically) to provide a sorted list of keys which then can be stored in an index file within the shard according to one embodiment. The output from each sorter system is coupled to one or more reducer systems, such as reducer systems 107A through 107N. The reducer systems receive the key and value pairs which have been sorted and create the shards by storing the keys and the values for its corresponding shard. In one embodiment, each reducer system is dedicated to creating only a particular shard such that each reducer system creates only the shards required to be created for its assigned shard. In this way, the workload of creating the shards among the reducer systems is distributed substantially evenly across the shards if the partitioner system 105 is able to create an even distribution of keys across the N shards.

The output from each reducer system, such as reducer system 107A, is stored on the corresponding partition or shard. In the case of a reducer system 107A, it stores its output in the shard 108A while the reducer system 107N stores its output in shard 108N.

Figure 3A:
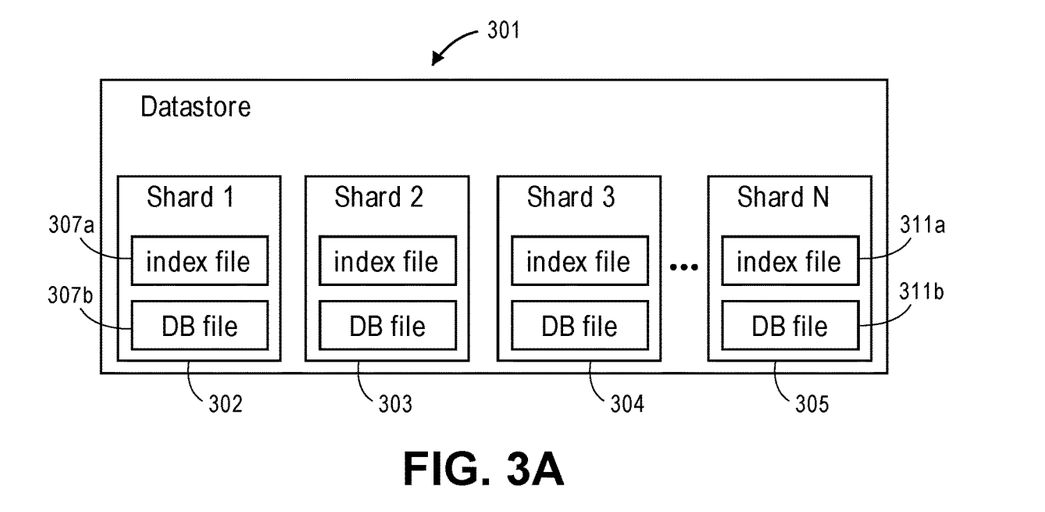
FIG. 3A shows an example of a data store containing a plurality of shards.

FIG. 3A shows an example of a data store 301 which includes the N shards. In the embodiment shown in FIG. 3A, each shard includes a dense index which includes an index file as well as a database (DB) file which contains the values corresponding to the keys stored in the index file within the same shard. For example, index file 307A includes a plurality of keys while database file 307B includes the corresponding values for those keys in the index file 307A. Each of the shards in the data store 301, such as shards 302, 303, 304, and 305 each include an index file and a database file. For example, shard N, which is shard 305, includes an index file 311A and a database file 311B. The data store 301 represents the set of N shards shown in FIG. 1 after they have been created by the distributed computing environment 101 in one embodiment.

Figure 3B:
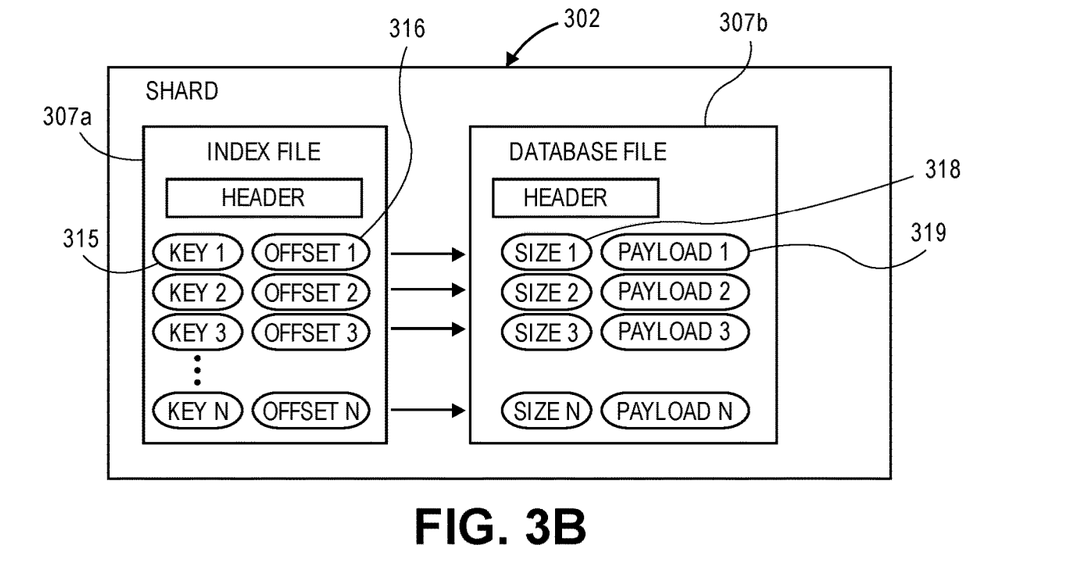
FIG. 3B provides a more detailed illustration of a particular shard which contains an index file and a database file.

FIG. 3B shows a more detailed example of one particular shard. It will be appreciated that each shard within a data store can be similar to the shard 302 shown in FIG. 3B. A shard 302 includes the index file 307A and the database file 307B. Within the index file 307A, there is a header and set of sorted keys, such as key 315 and a corresponding offset, such as offset 316. Each offset is computed based upon, in one embodiment, the corresponding payload value which in the case of offset 316 is the payload 319 which is the value associated or corresponding to key 315. Similarly, the value corresponding to key 2 in index file 307A is payload 2. The size of payload 319 is indicated by the size data 318 within the database file 307B. In one embodiment, the database file 307B can be implemented as an append only file in which new content or values are added at the end of the file. The keys, such as key 315 are sorted in one embodiment lexicographically by one of the sorter systems in a distributed computing environment as described herein. The keys are stored in the sorted order to allow searching using techniques known in the art for searching a sorted list of keys. Further information about searching will be provided below in conjunction with a description of FIG. 5.

Figure 3C:
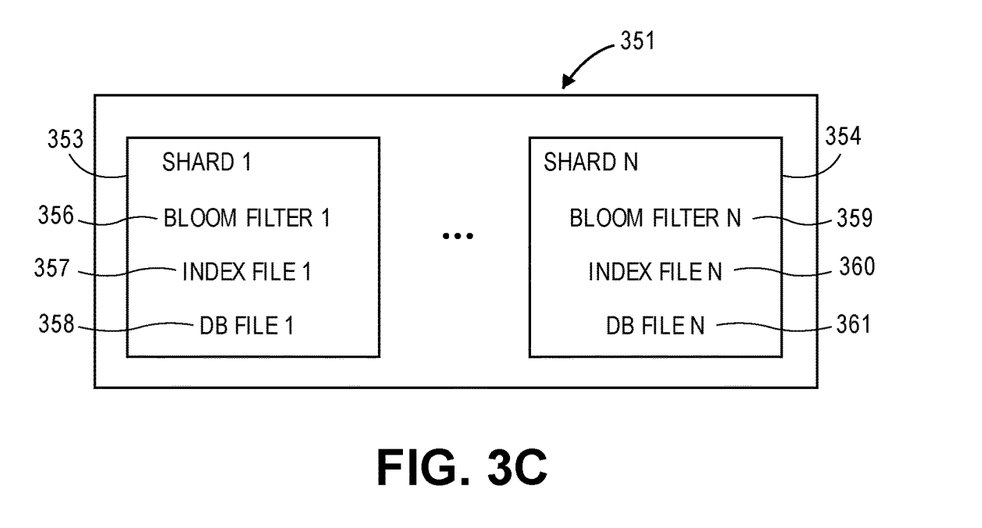
FIG. 3C shows an example of a data store which includes shards, each of which includes a Bloom filter used in an alternative embodiment.

FIG. 3C shows another example of a data store containing a plurality of shards according to an alternative embodiment. The data store 351 includes N shards, such as shard 353 and shard 354. Each shard includes a Bloom filter, an index file, and a database file. In particular, shard 353 includes a Bloom filter 356, an index file 357, and a database file 358. Similarly, shard 354 includes a Bloom filter 359, an index file 360, and a database file 361. The index files and the database files within the shards shown in FIG. 3C can be similar to the index files and the database files shown in FIG. 3B. Each of the shards shown in FIG. 3C also includes a Bloom filter for that particular shard. The Bloom filter is used to store, in one embodiment, quadtree keys representing tiles in a quadtree layout that represents a geographical or geospatial area such as a map of a city or town or state, etc. In one embodiment, the quadtree keys can be represented in a base 10 value with a shift offset to provide unicity across all modes in the quadtree layout. The Bloom filter allows a quick search to determine whether any data is present for a particular region. It is often the case that certain geographical regions are very sparse or so sparse that they contain no values. A geographic region such as a desert or tundra may contain no values for example. Thus, rather than searching through or using other techniques for finding a key in the sorted list of keys within the index file, the key for a region can be provided as an input to the Bloom filter which can then indicate whether or not any values are stored for that key. This can be implemented by not storing the quadtree key for a tile or region when there are no values for that key. In other words, if a tile or region is empty of values then the quadtree key for that tile is not stored in the Bloom filter. Thus when the Bloom filter is searched using that quadtree key, the Bloom filter will report that there are no corresponding values for that key and the search can end at that point without using techniques known in the art to search the sorted list of keys within the index file.

In one embodiment, each key is assigned to only one shard by the partitioner system 105. Moreover, in one embodiment, the partitioner system 105 attempts to distribute the keys substantially evenly across the shards, and this can mean that all sorters and all reducers in the pipeline of the distributed computing environment 101, for example, will get a similar, uniformly distributed amount of keys to index. Further, in one embodiment, the partitioner uses a hash function which is configured to provide entropy across hash values produced by the hash function for different keys in order to distribute the keys substantially evenly across the partitions or shards. Moreover, the entropy provided by the hash function can attenuate a hot spot, such as New York City or other geographical regions where there may be many, many values for a particular key. Thus, the hash function, by providing entropy, can distribute keys for such a particular geographic region, such as New York City, across most if not all of the partitions or shards rather than concentrating that particular geographic region within a particular shard.

Figure 4:
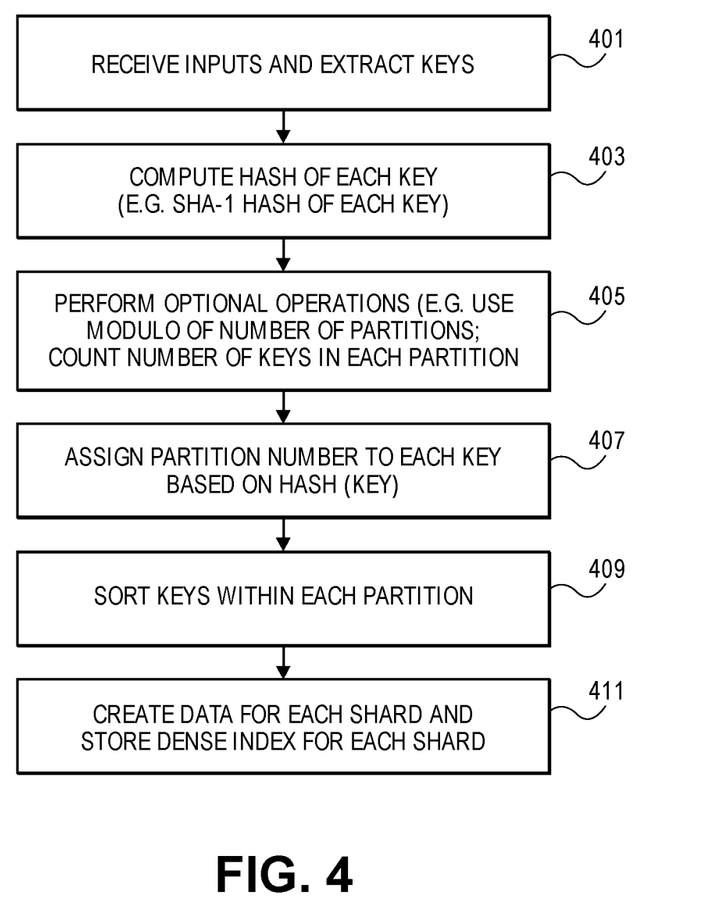
FIG. 4 is a flowchart which illustrates a method according to one or more embodiments described herein.

FIG. 4 shows a method which can be performed using the distributed computing environment shown in FIG. 1. In operation 401, the distributed computing environment receives the inputs and extracts the keys. The extraction of the keys can be performed in one embodiment by a set of mapper systems, such as mapper systems 104A through 104N. Then in operation 403, a partitioner, such as partitioner 105 computes a hash of each key. In one embodiment, the hash is performed by using the hash function which is configured to provide entropy across the produced hash values for all of the different keys to thereby distribute the keys substantially evenly across all of the shards or partitions being created by the distributed computing environment. In one embodiment, the hash function can be the hash function known as the SHA-1 hash. Then in operation 405 the partitioner can perform optional operations which are configured to provide a particular identifier or number of a partition for the key currently being processed. In one embodiment, a modulo N operation can be performed in order to obtain the final partition number for the particular key being currently processed. For example, in one embodiment, the number of partitions can be set at N (e.g. N=10), and the number N can be used in a module N operation to derive the shard identifier (shard_id) for each key. For example, the following function can be used to compute the shard identifier (where the hashed key will be interpreted as a 64 bit integer):

shard_id=hash(key) % N_Partition

In addition, operation 405 can also include an optional operation in which the number of keys in each partition is counted. This can be performed by keeping a running sum for each partition of the keys that have been allocated to a particular partition. The count can be used to verify that the keys are sufficiently dispersed across the shards.

Then in operation 407, each key is assigned to a particular partition by assigning a partition number or partition identifier to each key based upon the hash value computed in operation 403. Then in operation 409, the keys are sorted within each partition. In one embodiment, each of the sorters in a distributed computing environment, such as sorters 106A through 106N performs this sorting operation for its particular partition to which it is dedicated. Then in operation 411, the reducers, such as reducer systems 107A through 107N, create the data for each shard and store that data, such as a dense index, for each shard. The reducers in one embodiment also can create the quadtrees and quadtree keys and Bloom filters for each partition.

The method shown in FIG. 4 is repeated for each key, and each key along with its corresponding value is stored to create, for example, the dense index stored within each shard which ultimately creates the data store that can be searched, such as data store 301 shown in FIG. 3A.

Figure 5:
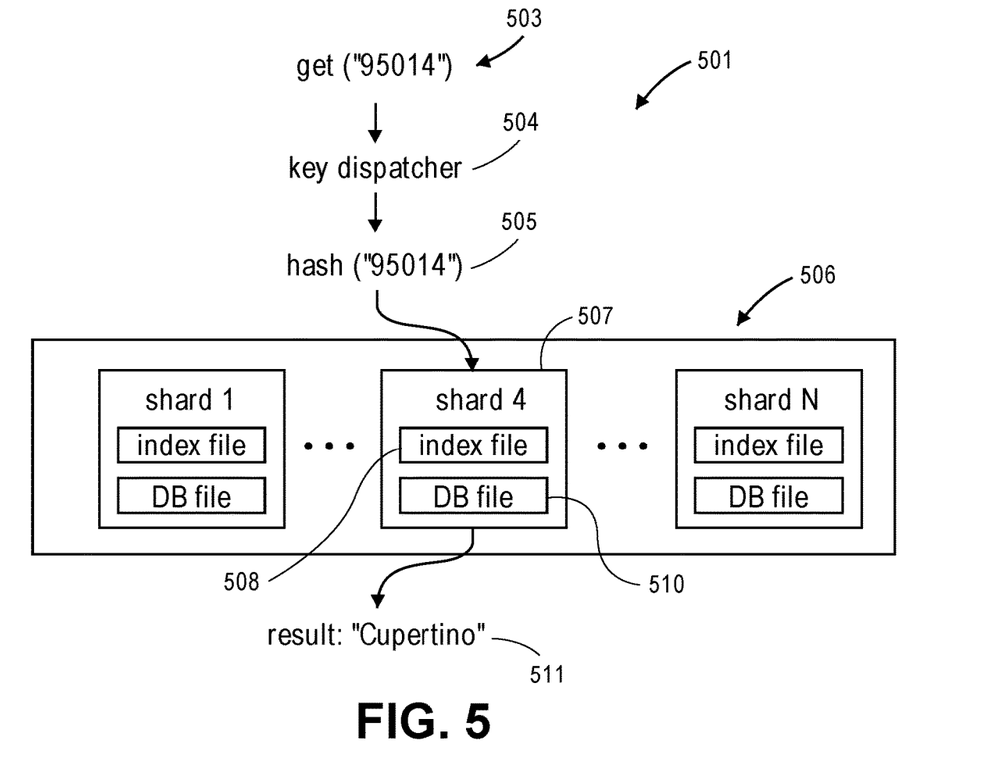
FIG. 5 illustrates a search process using a data store, such as the data store 301 in one embodiment.

FIG. 5 will now be described to provide an example of how the data store can be searched at run time after the data store has been created. The data store can receive an input to perform a search, such as a search query which is shown as get 503 in FIG. 5. This in turn causes a key dispatcher 504 in the process 501 to perform a hash function on the input which in this case is the zip code 95014. The hash function 505 returns a hash value which can then be used to determine the particular shard in which the key is stored within the index file 508 in the shard 507 in the data store 506. The hash function 505 is in one embodiment the same hash function which was used in operation 403 to assign the key to the shard 507. Further, any operations (e.g. modulo N) that were performed to derive the partition identifier for that key are also performed with the hash function 505 in order to derive the particular shard that stores the key in the search query. Using techniques that are known in the art, the key can then be used to search the index file 508 to then cause the retrieval of the value corresponding to the key "95014" from DB file 510 to return the result 511 which in this case is the city Cupertino.

Another aspect of the embodiments described herein relate to the use of base 10 quadtree keys stored within nodes of a quadtree. Quadtrees have been used in the past to store a locational code derived from the Z order of the quadrants of a geographical region, such as a map.

Figure 6A:
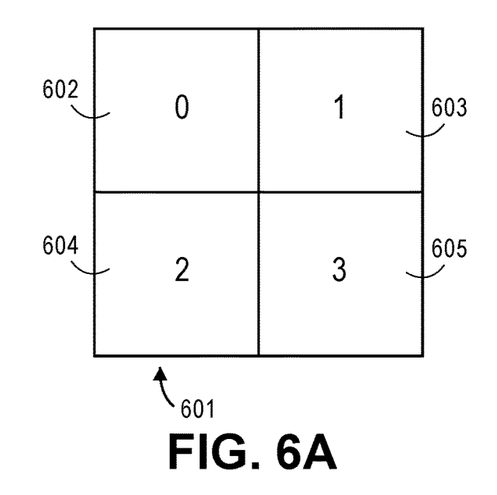
FIG. 6A shows a subdivided geographical region, such as a map which has been subdivided into four quadrants.
Figure 6B:
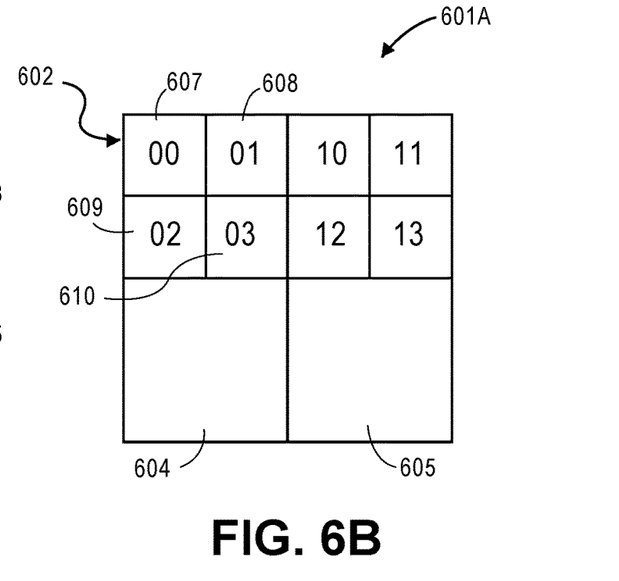
FIG. 6B shows the same geographical region of FIG. 6A except that two of the quadrants have been further subdivided into sub-quadrants.

FIG. 6A shows an example of a geographical region 601, which can be a map of a region which has been subdivided into four quadrants which are quadrants 602, 603, 604, and 605. The numbers 0, 1, 2, and 3 have been assigned to each of the respective quadrants according to the Morton code or Z-order code, and this is repeated when the quadrants are subdivided to create sub-quadrants as shown in FIG. 6B which shows eight sub-quadrants in the upper half of the geographic region 601 which has now become geographic region 601A after the further subdivision. The sub-quadrants include sub-quadrants 607, 608, 609, and 610 which are all contained within the quadrant 602. The values shown within each sub-quadrant can be the quad key values, each of which is the address of the tile represented by the quadtree key or quadkey. For example, quadkey "00" is the address for the sub-quadrant 607 and is represented by a number in base 4 values.

Figure 6C:
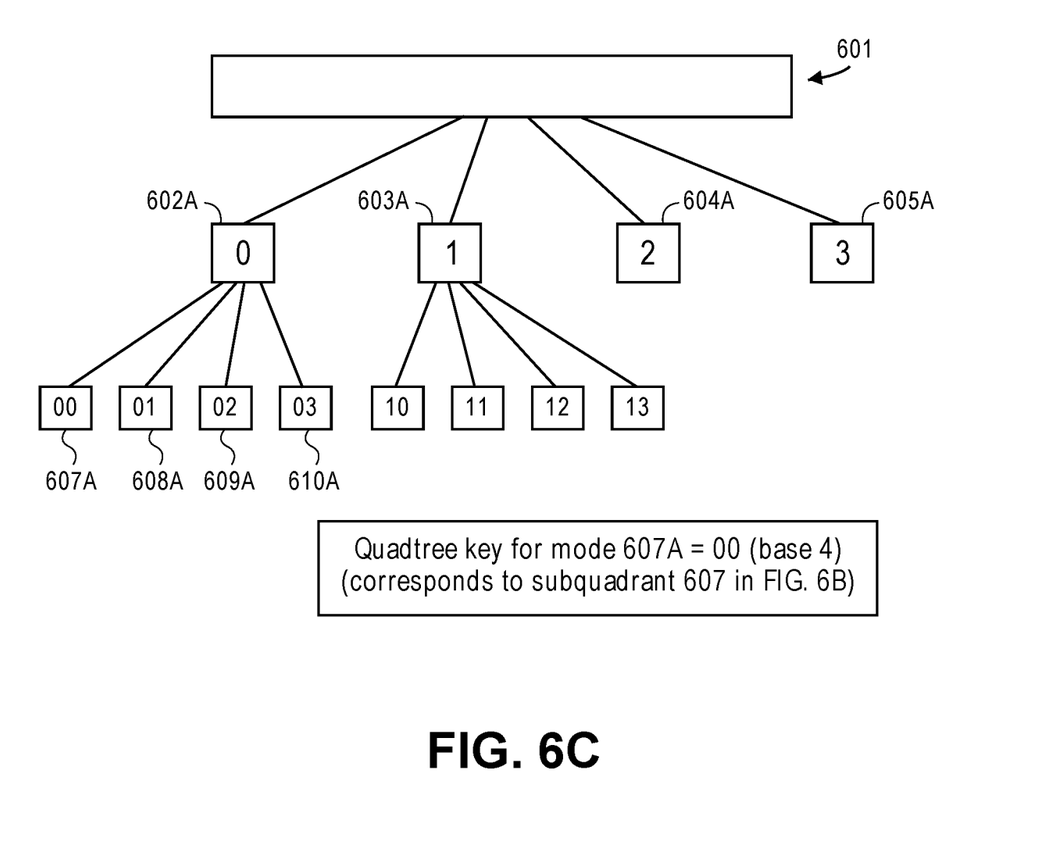
FIG. 6C shows a quadtree representation of the subdivided geographical region 601.

FIG. 6C shows an example of a quadtree containing the quadtree keys which specify the address of the tiles shown in FIG. 6B. Thus, the node 607A includes a quadtree key "00" (in base 4) which corresponds to the sub-quadrant 607 shown in FIG. 6B. Similarly, the node 608A includes quadtree key "01" (in base 4) which corresponds to the sub-quadrant 608 shown in FIG. 6B, the node 609A includes quadtree key "02" (in base 4) which corresponds to the sub-quadrant 609 shown in FIG. 6B, and the node 610A includes quadtree key "03" (in base 4) which corresponds to the sub-quadrant 610 shown in FIG. 6B. Similarly, node 602A specifies the address for the quadrant 602, and nodes 603A, 604A, and 605A respectively specify the addresses of the quadrant 603, 604, and 605. As is known in the art, the quadtrees can be indexed by using the quadkey as the address of the tile in order to retrieve the content from that tile at search time. The methods in the prior art use base 4 address values as the tile keys. In one embodiment described herein, base 10 values rather than base 4 values are used in order to significantly save space by representing the sequence in a 64 bit integer instead of a string that would otherwise be equal to the zoom level in bytes. In order to do this, in one embodiment, a shift key that allows the definition of a unique key for both leaf and internal nodes is used. The shift key represents an offset in the hierarchy from which a given locational code will be defined with. This offset allows the use of a compact representation in base 10 of each quadkey while maintaining unicity. It is defined such that:

$$\underbrace{K(lat, lng, z)}_{\text{Shift Key}} = \left( \underbrace{\sum_{n=1}^{n=z-1} 4^n - 1}_{\text{Shift Offset}} \right) + \underbrace{QK_{10}(lat, lng, z)}_{\text{Quadkey Base 10}}$$

Where:

Z represents the zoom level

Lat and lng respectively represents the latitude and longitude as defined in the WGS84 datum.

The sum operation here defines a recursive computation where the current value is defined by the previous value until reaching the lower bound (1 in this case) or the upper bound (z−1). "n" is a common named variable used in the sum notation as a holder of the current iteration in this case, "n" is a varying integer that is sequentially assigned a value in between [1, Z−1].

Figure 7:
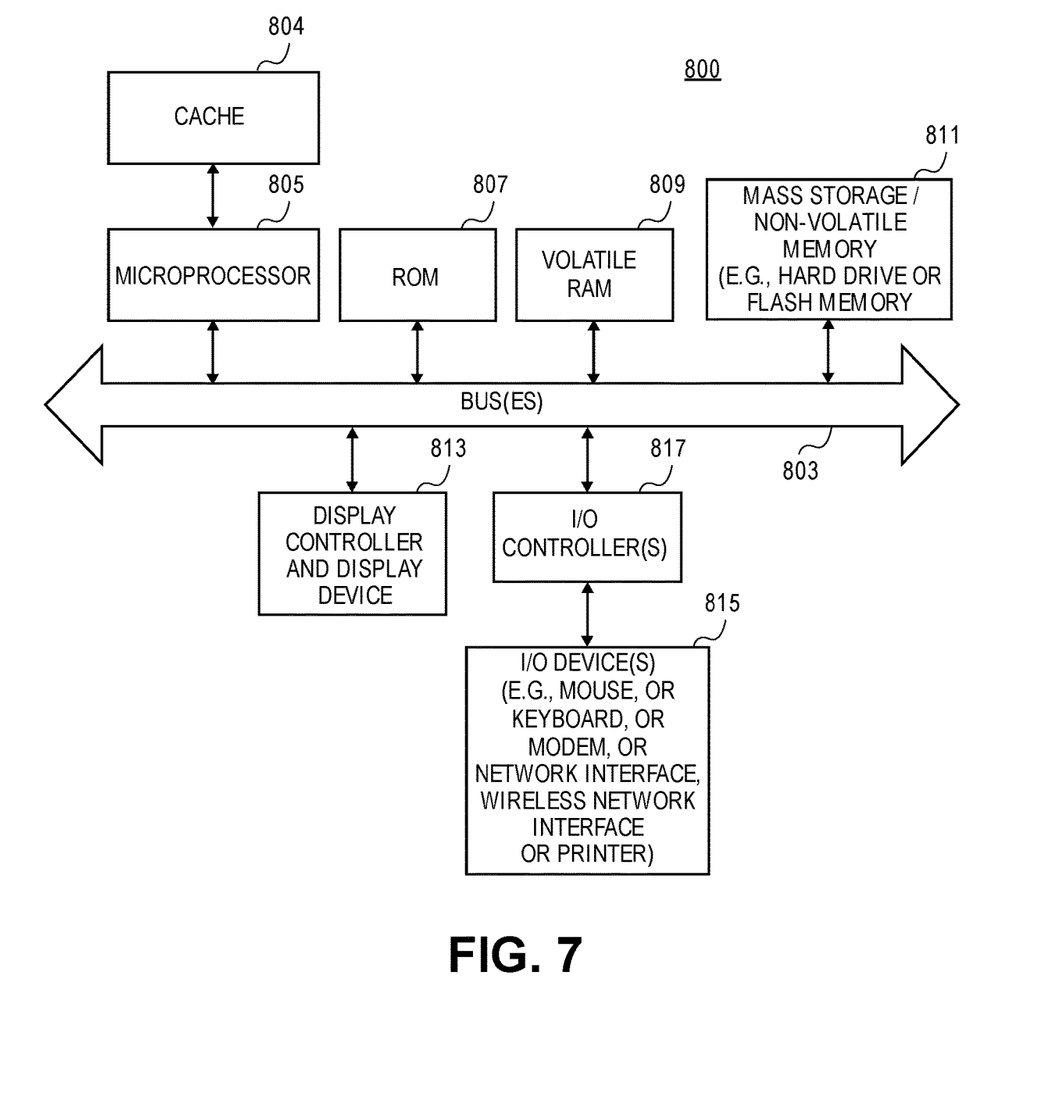
FIG. 7 shows an example of a data processing system which can be used to implement one or more embodiments described herein.

FIG. 7 shows one example of a data processing system which may be used with any one of the embodiments described herein as one of the data processing systems in a distributed computing environment. Note that while FIG. 7 illustrates various components of a data processing system, it is not intended to represent any particular architecture or manner of interconnecting the components as such details are not germane to this description. The system shown in FIG. 7 can be used to implement each of the systems in a distributed computing environment such as partitioner 105 or sorter 106N, etc.

As shown in FIG. 7, the computer system 800, which is a form of a data processing system, includes a bus 803 which is coupled to one or more microprocessor(s) 805 and a ROM (Read Only Memory) 807 and volatile RAM 809 (e.g. DRAM) and a non-volatile memory 811. The one or more microprocessors 805 are coupled to optional cache 804. The one or more microprocessors 805 may retrieve the stored instructions from one or more of the non-transitory memories 807, 809 and 811 and execute the instructions to perform operations described above. These memories represent examples of machine readable non-transitory storage media that can store or contain computer program instructions which when executed cause a data processing system to perform the one or more methods described herein. The bus 803 interconnects these various components together and also interconnects these components 805, 807, 809 and 811 to a display controller and display device 813 and to peripheral devices such as input/output (I/O) devices 815 which may be one or more of mice, touch screens, touch pads, touch sensitive input devices, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory system which maintain data (e.g., large amounts of data) even after power is removed from the system. Mass storage 811 is a persistent memory. Typically the mass storage 811 will also be a random access memory although this is not required. While FIG. 7 shows that the mass storage 811 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable instructions which when executed by one or more data processing systems that implement a partitioned database in a distributed computing environment, cause the one or more data processing systems to perform a method comprising:
   receiving a plurality of inputs, each input comprising a key and value pair to be stored in a partition of a plurality, N, of partitions of the partitioned database, where in each partition comprises a database shard having a Bloom filter that stores values representing geospatial tiles or regions in a map;
   computing, for each key, a single hash value using a hash function modulo N, the hash function configured to provide entropy across hash values for different keys to distribute the keys substantially evenly across the plurality of N partitions;
   determining, based on the hash value of each key, modulo N, a partition identifier and mapping the corresponding key to the determined partition identifier;
   for each partition identifier having one or more keys mapped to the partition having the partition identifier:
      distributing the one or more keys and their paired values to the partition having the partition identifier;
      performing, separately within each partition on a data processing system dedicated to processing the partition;
         sorting the one or more keys distributed to the partition into an ordering to provide a sorted set of keys mapped to the partition;
         storing the sorted keys into an index file and storing their paired values in a database file, wherein each key refers to its paired value in the database file within the partition;
   wherein the processing operations for the partition further include processing one or more queries directed to one or more keys that, when hashed modulo N, map to the partition;
   wherein a key and the value associated with the key are accessed by hashing the key modulo N to determine the partition associated with the key and sending the key and an access request to the determined partition; and
   in response to determining that the key is not present in a tile of the Bloom filter for the partition, determining that the key is not present in the partition,
      such that no central index or central mapping of keys to partitions is maintained in the distributed computing system.

2. The medium as in claim 1 wherein each database shard is an append-only file.

3. The medium as in claim 1 wherein the keys represent different geospatial areas and keys for at least one city or geospatial region are dispersed across most, or all shards, due to the entropy.

4. The medium as in claim 3 wherein the entropy balances an indexing workload and storage usage across all of the data processing systems that process all of the shards and wherein the entropy disperses keys for one geospatial area across a plurality of shards.

5. The medium as in claim 1 further comprising:
   receiving a query against the partitioned database;
   determining one or more keys derived from the query;
   for each key of the one or more keys:
      determining a partition identifier corresponding to the key by hashing the key, modulo N;
      transmitting the key to the partition having the partition identifier to query the partition for a value corresponding to the key; and
      returning a value corresponding to the key, in response to determining that the key matches a key in the index file stored in the partition.

6. The medium as in claim 1 wherein each partition has a set of one or more data processing systems dedicated to sorting and storing within the partition and wherein determining partition identifiers is performed by a single data processing system.

7. The medium as in claim 1 wherein accessing a value having a key in a determined partition includes:
   determining whether the key is present in a tile or region of a Bloom filter for the partition, and in response to the key being present in the tile or region of the Bloom filter, searching the index file of the partition for the key, and returning the value corresponding to the key, otherwise:
   returning a null value.

8. The medium as in claim 1 wherein the values stored in the Bloom filter are quadtree keys representing tiles in a quadtree layout that represents a geospatial area.

9. The medium as in claim 8 wherein the quadtree keys are represented in base 10 values with a shift offset to provide unicity across all nodes in the quadtree layout.

10. The medium of claim 1, wherein the hash function is a secure hash function ("SHA").

11. The medium of claim 1, wherein generating and indexing the partitioned database are performed offline.

12. A method practiced one or more data processing systems that implement a partitioned database in a distributed computing environment, the method comprising:

receiving a plurality of inputs, each input comprising a key and value pair to be stored in a partition of a plurality, N, of partitions of the partitioned database, wherein each partition comprises a database shard having a Bloom filter that stores values representing geospatial tiles or regions in a map;

computing, for each key, a single hash value using a hash function, modulo N, the hash function configured to provide entropy across hash values for different keys to distribute the keys substantially evenly across the plurality of N partitions;

determining, based on the hash value of each key modulo N, a partition identifier and mapping the corresponding key to the determined partition identifier;

for each partition identifier having one or more keys mapped to the partition identifier:
  distributing the one or more keys and their paired values to the partition having the partition identifier;
  performing, separately within each partition on a data processing system dedicated to processing the partition;
    sorting the one or more keys distributed to the partition into an ordering to provide a sorted set of keys mapped to the partition;
    storing the sorted keys into an index file and storing their paired values, in database file in the partition, wherein each key refers to its paired value in the database file within the partition;
  wherein the processing operations for the partition further include processing one or more queries directed to one or more keys that, when hashed modulo N, map to the partition;
  wherein a key and the value associated with the key are accessed by hashing the key modulo N to determine the partition associated with the key and sending the key and an access request to the determined partition; and
  in response to determining that the key is not present in a tile of the Bloom filter for the partition, determining that the key is not present in the partition,
and no central index or mapping of keys to partitions is maintained in the distributed computing system.

13. The method as in claim 12 wherein each database shard is an append-only file.

14. The method as in claim 12 wherein the keys represent different geospatial areas and keys for at least one city or geospatial region are dispersed across most, or all, shards due to the entropy.

15. The method as in claim 14 wherein the entropy balances an indexing workload and storage usage across all of the data processing systems that process all of the shards and wherein the entropy disperses keys for one geospatial area across a plurality of shards.

16. The method as in claim 12 further comprising:
receiving a query against the partitioned database;
determining one or more keys derived from the query;
for each key of the one or more keys:
  determining a partition identifier corresponding to the key by hashing the key, modulo N;
  transmitting the key to the partition having the partition identifier to query the partition for a value corresponding to the key; and
  returning a value corresponding to the key, in response to determining that the key matches a key in the index file for the partition stored in the partition.

17. The method as in claim 12 wherein each partition has a set of one or more data processing systems dedicated to sorting and storing within the partition and wherein determining partition identifiers is performed by a single data processing system.

18. The method as in claim 12 wherein accessing a value having a key in a determined partition includes:
determining whether the key is present in a tile or region of a Bloom filter for the partition, and in response to the key being present in the tile or region of the Bloom filter, searching the index file of the partition for the key, and returning the value corresponding to the key, otherwise:
returning a null value.

19. The method as in claim 12 wherein the values stored in the Bloom filter are quadtree keys representing tiles in a quadtree layout that represents a geospatial area.

20. The method as in claim 19 wherein the quadtree keys are represented in base 10 values with a shift offset to provide unicity across all nodes in the quadtree layout.

* * * * *